United States Patent [19]
Hazen et al.

[11] Patent Number: 5,384,048
[45] Date of Patent: Jan. 24, 1995

[54] BIOREMEDIATION OF CONTAMINATED GROUNDWATER

[75] Inventors: Terry C. Hazen; Carl B. Fliermans, both of Augusta, Ga.

[73] Assignee: The United States of America as represented by the United States Department of Energy, Washington, D.C.

[21] Appl. No.: 207,506

[22] Filed: Mar. 8, 1994

Related U.S. Application Data

[63] Continuation-in-part of Ser. No. 935,950, Aug. 27, 1992.

[51] Int. Cl.⁶ ............................................. C02F 3/30
[52] U.S. Cl. ................................ 210/605; 210/610; 210/630; 210/747; 210/901; 435/262.5
[58] Field of Search ............... 210/605, 610, 611, 620, 210/630, 603, 747, 901; 435/262, 262.5, 264

[56] References Cited

U.S. PATENT DOCUMENTS

| | | | |
|---|---|---|---|
| 3,846,290 | 11/1974 | Raymond | 210/610 |
| 4,401,569 | 8/1983 | Jhaveri et al. | 210/610 |
| 4,588,506 | 5/1986 | Raymond et al. | 210/606 |
| 4,664,805 | 5/1987 | Focht | 210/611 |
| 4,683,064 | 7/1987 | Hallberg et al. | 210/605 |
| 4,713,343 | 12/1987 | Wilson, Jr. | 435/264 |
| 4,749,491 | 6/1988 | Lawes et al. | 210/610 |
| 4,765,902 | 8/1988 | Ely et al. | 210/610 |
| 4,832,122 | 5/1989 | Corey et al. | 166/50 |
| 4,853,334 | 8/1989 | Vandenbergh et al. | 435/262 |
| 4,954,258 | 9/1990 | Little | 210/611 |
| 4,968,427 | 11/1990 | Glanser et al. | 210/610 |
| 4,992,174 | 2/1991 | Caplan et al. | 210/610 |
| 5,006,250 | 4/1991 | Roberts | 210/610 |
| 5,024,949 | 6/1991 | Hegeman et al. | 435/264 |
| 5,057,221 | 10/1991 | Bryant et al. | 210/610 |
| 5,196,121 | 3/1993 | Moore et al. | 210/610 |

OTHER PUBLICATIONS

Aerobic Metabolism of Trichloroethylene by a Bacterial Isolate.
Biodegradation of Trichloroethylene and Involvement of an Aromatic Biodegradative Pathway.
Characterization of Trichloroethylene Biodegradation by Strain G4.
A Fixed-Film Bioreactor To Treat Trichloroethylene-taden Water From Interdiction Wells.
Biological Approaches To Aquifer Restoration Recent Advances and New Opportunities, Jun. 17, 1986.
Biodegradation of Chlorinated Ethenes by a Methane-Utilizing Mixed Culture.

*Primary Examiner*—Christopher Upton
*Attorney, Agent, or Firm*—Brian R. Tumm; Harold M. Dixon; William R. Moser

[57] ABSTRACT

An apparatus and method for in situ remediation of contaminated subsurface soil or groundwater contaminated by chlorinated hydrocarbons. A nutrient fluid is selected to stimulate the growth and reproduction of indigenous subsurface microorganisms that are capable of degrading the contaminants; an oxygenated fluid is selected to create a generally aerobic environment for these microorganisms to degrade the contaminants, leaving only pockets that are anaerobic. The nutrient fluid is injected periodically while the oxygenated fluid is injected continuously and both are extracted so that both are drawn across the plume. The nutrient fluid stimulates microbial colony growth; withholding it periodicially forces the larger, healthy colony of microbes to degrade the contaminants. Treatment is continued until the subsurface concentration of contaminants is reduced to an acceptable, preselected level. The nutrient fluid can be methane and the oxygenated fluid air for stimulating production of methanotrophs to break down chlorohydrocarbons, especially trichloroethylene (TCE) and tetrachloroethylene.

19 Claims, 2 Drawing Sheets

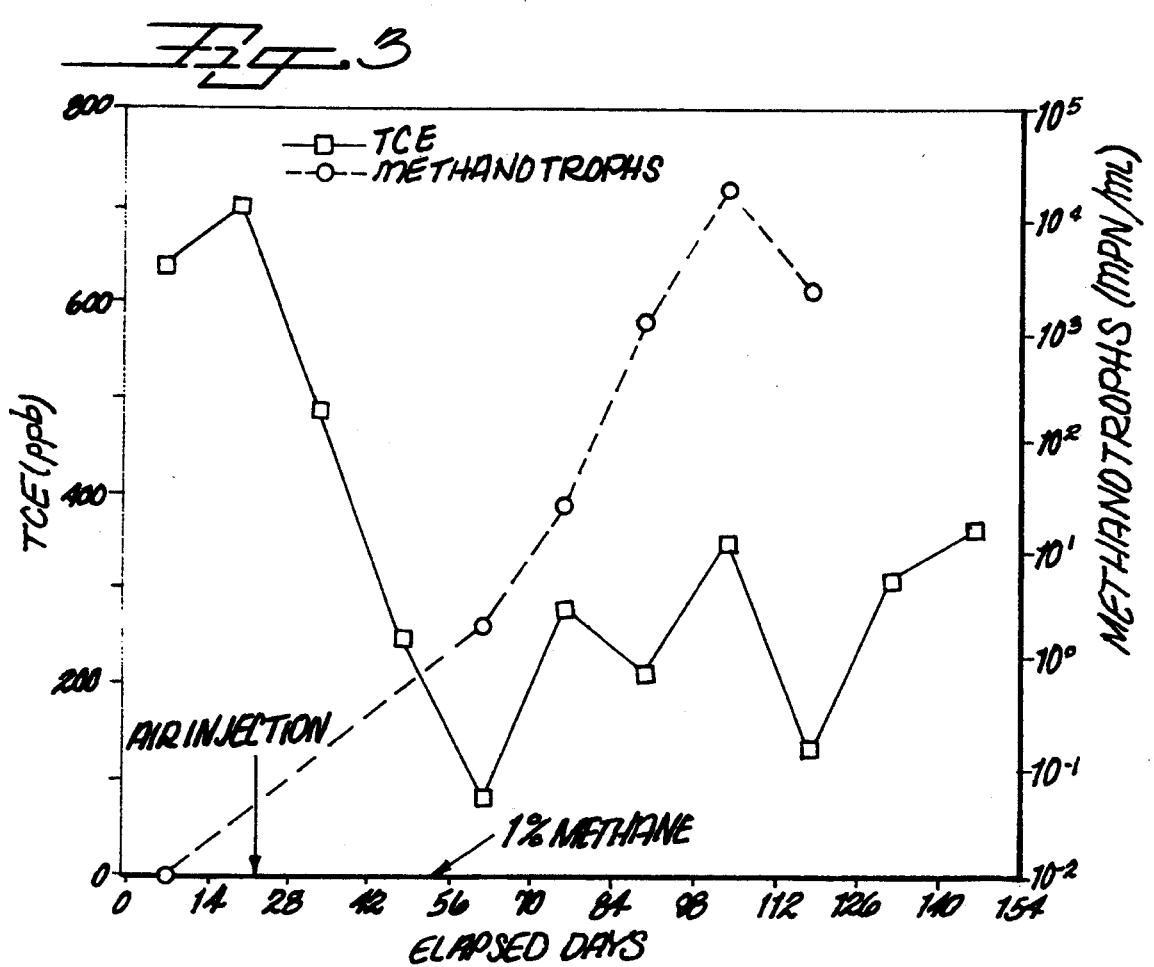

BIOREMEDIATION OF CONTAMINATED GROUNDWATER

The United States Government has rights in this invention pursuant to Contract No. DE-AC09-89SR18035 between the U.S. Department of Energy and Westinghouse Savannah River Company.

This is a continuation-in-part application of Ser. No. 07/935,950 filed Aug. 27, 1992.

BACKGROUND OF THE INVENTION

1. Field of the Invention

The present invention relates to a method for in situ bioremediation of contaminated soil and groundwater. In particular, the invention relates to remediation of contaminated soil and groundwater by the injection of nutrients to stimulate growth of pollutant-degrading microorganisms.

2. Discussion of Background

Manufacture, transportation, and use of chlorinated hydrocarbons often results in accidental releases of these pollutants that contaminate subsurface soils and groundwater. Such contamination damages the local ecosystem, posing serious potential health problems if local groundwater is used as a source of drinking water or irrigation water, or if the soil is used for growing crops. Adjacent ecosystems may be affected if the contaminants migrate from the site with the flow of groundwater. Contamination of groundwater by organic compounds is recognized as one of the most important pollution problems of the industrialized nations. For example, it is estimated that over 15% of community drinking water supplies in the United States are currently contaminated with chlorinated hydrocarbons. As reliance on groundwater for drinking water, irrigation, and industrial uses increases, the problem will assume increasing urgency.

Soil can be treated by excavating the contaminated subsurface materials such as soils, sediments, fractured rock, and the like. The excavated materials are treated to remove the contaminants or simply stored elsewhere. Groundwater may be removed along with excavated soil or be pumped to the surface of the earth for treatment. These direct methods of dealing with contaminated groundwater are relatively expensive.

Other methods are available for treating contaminated sites in situ. A horizontal well system for treatment of contaminated groundwater is described in commonly assigned U.S. Pat. No. 4,832,122 issued to Corey, et al. This system comprises two sets of wells, an injection well for injecting a fluid into a saturated zone on one side of or within a plume of contaminants and an extraction well for collecting the fluid together with volatilized contaminants from the plume on the other side of, above or within the plume.

A number of techniques for treating contaminated groundwater involve pumping the water above ground for filtration and treatment. Nutrients may be added to stimulate the growth rate of indigenous microorganisms that are capable of oxidizing the contaminants, or the microbial population may be supplemented with naturally-occurring or genetically altered exogenous microorganisms. As the microbial population increases, more and more microbes are available to degrade the contaminants. When the contaminant concentration decreases to acceptable levels, the nutrient supply is terminated and the microbial population returns to background, pretreatment levels. Lawes, et al. (U.S. Pat. No. 4,749,491) extract contaminated groundwater, mix it with an aqueous hydrogen peroxide solution and nutrients, and inject the mixture back into the contaminated zone through an infiltration well. Caplan, et al. (U.S. Pat. No. 4,992,174) and Jhaveri, et al. (U.S. Pat. No. 4,401,569) add microorganisms and nutrients to groundwater, then return the mixture to the ground.

Instead of pumping contaminated groundwater to an above-ground treatment center, nutrients and microorganisms may be supplied in situ via injection wells. Contaminants and oxidized byproducts may be removed, if desired, via nearby extraction wells. Systems are available for supplying water and nutrients (Ely, et al., U.S. Pat. No. 4,765,902), hydrogen peroxide and oxygen (Raymond, et al., U.S. Pat. No. 4,588,506), nutrients and oxygen (Raymond, U.S. Pat. No. 3,846,290) and denitrification organisms Hallberg, et al. (U.S. Pat. No. 4,683,064) to contaminated sites.

The principal existing technology for remediation of groundwater contaminated with trichloroethylene (TCE) involves pumping followed by air stripping. Contamination of unsaturated sediment can only be remediated by vapor extraction. Neither of these techniques results in destruction of the contaminants: the TCE is either discharged to the atmosphere or, where emissions restrictions are in effect, captured on activated carbon for subsequent disposal.

TCE can be mineralized in soil when exposed to air and natural gas (Nelson et al., "Biodegradation of TCE and Involvement of an Aromatic Biodegradative Pathway", 53, 5 (May 1987) pp. 949–954). Some studies indicate that chlorinated solvents slowly degrade in the presence of methane or propane (Wilson, "Aquifer Microbiology and Aerobic Transformations of Chlorinated Solvents", June 1986, Stanford University Seminar on Biological Approaches to Aquifer Restoration-Recent Advances and New Opportunities). However, these techniques are not applicable to large-scale in situ treatment of TCE-contaminated groundwater.

Laboratory studies have shown that chlorinated hydrocarbons, including TCE, are aerobically biodegradable in liquid cultures with methane-oxidizing bacteria known as methanotrophs (Fogel et al., "Biodegradation of Chlorinated Ethanes by a Methane-Utilizing Mixed Culture", App. Environ. Microbiol., 51, 4 (Apr. 1986) pp. 720–724). Methanotrophs are naturally occurring and widespread microbes. The primary enzyme in the oxidation chain is methane mono-oxygenase, an extremely powerful oxidizer with the capability of oxidizing a wide variety of normally recalcitrant compounds, including chlorinated hydrocarbons and especially TCE. The soluble form of methane mono-oxygenase (Type I) induces formation of TCE-epoxide from TCE. TCE-epoxide is extremely unstable and spontaneously breaks down to simpler daughter compounds such as formate. All the daughter compounds of TCE are either unstable, or small and easily metabolizable compounds. The final (and almost immediate) end products of methanotroph-induced TCE-epoxide formation are carbon dioxide ($CO_2$) and various chloride salts.

Aerobic degradation of TCE results in nontoxic end products, avoiding the formation of toxic by-products of anaerobic degradation such as vinyl chloride. Unfortunately, methanotrophs occur naturally in very small concentrations, as low as ten cells per milliliter of groundwater. Therefore, under normal circumstances, they cannot be counted on to degrade pollutants to any significant degree.

There is a need for a cost-effective method for in situ remediation of subsurface soil or groundwater contaminated by chlorinated hydrocarbons such as TCE. The treatment should degrade the contaminants in situ, and result in nontoxic end products that need not be removed from the site. The treatment should be capable of reducing the subsurface concentration of contaminants to an acceptable level, preferably below detectable limits.

SUMMARY OF THE INVENTION

According to its major aspects and broadly stated, the present invention is a method for in situ remediation of contaminated soil or groundwater, particularly soil and groundwater contaminated by chlorinated hydrocarbons such as trichloroethylene (TCE) and tetrachloroethylene. A nutrient fluid is selected to stimulate the growth and reproduction of indigenous subsurface microorganisms that are capable of degrading the contaminants; an oxygenated fluid is selected to create an aerobic and, at least temporarily, a combined aerobic/anaerobic environment for these microorganisms to degrade the contaminants. Remediation is carded out by periodically injecting a mixture of the nutrient and oxygenated fluids, then just the oxygenated fluid. The nutrient fluid builds up the concentration of microbes capable of degrading the pollutants; the absence of the nutrient fluid forces these microbes to degrade the pollutant. The oxygenated fluid assures the proper environment for that biological degradation. The fluids are drawn through the plume so that the nutrient fluid stimulates growth of the microbial colony in the plume. Treatment is continued until the subsurface concentration of contaminants is reduced to a preselected level, such as a level required by government regulations or perhaps a minimum detectable level.

By way of example, a substantially methane-containing nutrient fluid in an oxygenated fluid such as air stimulates production of subsurface methanotrophs that degrade chlorinated hydrocarbons, especially trichloroethylene (TCE), tetrachloroethylene and related compounds.

An important feature of the present invention is the combination of the injecting and extracting the fluids. Injecting and extracting establishes a flow gradient through the plume in the soil so that the fluids reach all parts of the plume. The optimum configurations for the injection and extraction for a particular site are determined by the size and shape of the contaminant plume, the types and concentrations of contaminants present in the plume, the subsurface geology of the area, groundwater flow rates in the area, and drilling economics.

Another feature of the present invention is the nutrient fluid. The nutrient fluid is selected to stimulate the growth and reproduction of subsurface microorganisms that exist in the soil (or can be placed there by inoculation) and are capable of degrading the contaminants present in the plume. For example, methane stimulates an increase in the subsurface methanotroph population, known as degraders of important and widespread pollutants. Methane is mixed with the oxygenated fluid so that the concentration of methane in the mixture is less than 5 vol. % (the lower explosive limit of methane in air), and preferably approximately 4 vol. % or 1 vol. % (depending on the injection procedure). The nutrient fluid is drawn across the plume where it stimulates increased growth and reproduction of indigenous subsurface methanotrophs. The methane-induced enzymes in methanotrophs co-metabolically oxidize over two hundred and fifty organic compounds, including trichloroethylene (TCE), tetrachloroethylene, polychloroethylene (PCE), benzene, toluene, and xylene, all common pollutants. These pollutants must be reduced to very low levels (less than 5 ppb) by government regulations for groundwater to be considered non-polluted.

A further feature of the present invention is the selection of an oxygenated fluid that creates an environment for the subsurface microorganisms to oxidize the contaminants in the plume. "Oxygenated" is used herein to mean a fluid that contains oxygen, either free or bound, but otherwise available for aerobic degradation of chemical species in the soil by microbes. The oxygenated fluid establishes an environment in the plume that permits degradation and that avoids formation of or quickly destroys toxic by-products of TCE such as vinyl chloride. The oxygenated fluid is preferably air, but it may be some other suitable oxygen-containing fluid such as pure oxygen, oxygen-nitrogen mixtures, water vapor, or steam.

The pulsing or cycling of the treatment fluid into the plume is an important feature of the present invention. Treatment consists of periodic injections of the nutrient fluid with oxygenated fluid such as a methane/air mixture, followed by injection of the oxygenated fluid alone, without the methane. The contaminant plume is saturated with a nutrient fluid to stimulate increased reproduction of the desired microorganisms.

The microorganisms must alternately "feast" when methane is included and "starve" when it is not. During the "feast" period of the cycle, availability of the nutrient fluid stimulates reproduction, leading to increased population density. During the "starve" period, the preferred nutrient is lacking and the microorganisms are forced to consume the contaminants from which they derive little or no energy. Consequently, the microbial density will eventually begin to decrease. The cycle is then repeated until the measured contaminant concentration is reduced to a preselected level.

The duration of each cycle is empirically determined during treatment and depends on factors including the subsurface geology and the types and concentrations of the contaminants in the plume. A cycle may take as little as a few days, or several weeks or months. Injection of the methane can cease when the plume is saturated. The resumption of methane injection can begin when the microbial concentration begins to decline. During a typical cycle, the subsurface methanotroph population can increase by a factor of $10^6$ or more. Treatment can result in degradation of pollutants down to detectable levels, on the order of 2 ppb, the currently minimum detectable level.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings.

FIG. 3 shows subsurface methanotroph concentration and TCE concentration versus elapsed time during use of the invention.

DETAILED DESCRIPTION OF A PREFERRED EMBODIMENT

The present invention is a method for in situ remediation of contaminated subsurface soil or groundwater, particularly soil and groundwater contaminated by chlorinated hydrocarbons. A nutrient fluid and an oxygenated fluid are selected. The nutrient fluid stimulates the growth and reproduction of indigenous subsurface microorganisms that are capable of degrading the contaminants; the oxygenated fluid creates an aerobic and, at least temporarily, a combined aerobic/anaerobic environment for these microorganisms to oxidize the contaminants.

Remediation is carried out by periodically injecting the nutrient fluid in spaced relation to the contaminant plume and causing the fluid to diffuse throughout the plume, thereby stimulating the subsurface population of these microorganisms to increase. The oxygenated fluid is continuously injected in spaced relation to the plume, diffusing into the plume and creating an environment in which the microorganisms can break down the contaminants. Treatment is cyclic, that is, the nutrient fluid is injected in discrete pulses. Treatment is continued until the subsurface concentration of contaminants is reduced to an acceptable level. For example, a mixture of methane and an oxygen-containing oxygenated fluid stimulates production of subsurface methanotrophs which degrade chlorinated hydrocarbons, especially trichloroethylene (TCE), tetrachloroethylene and related compounds.

Methanotrophs are naturally occurring microbes that are found in most all locations. To the extent that a location's groundwater polluted with chlorinated hydrocarbons does not contain methanotrophs, the subsurface can be inoculated with methanotrophs.

Figure 1:
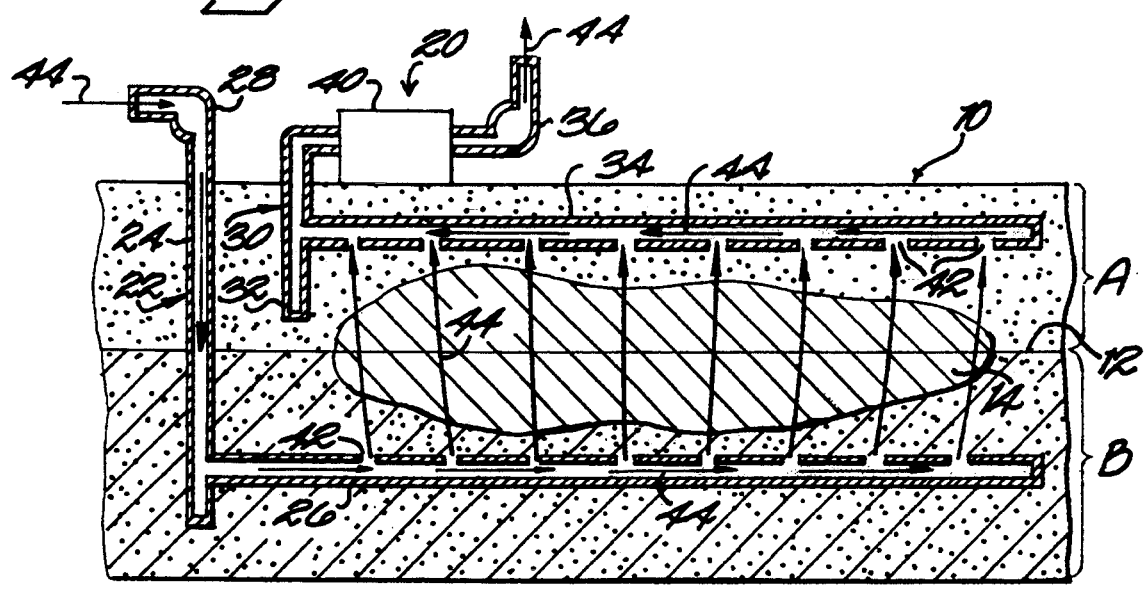
FIG. 1 is a side cross-sectional view of a physical embodiment of a bioremediation method according to a preferred embodiment of the present invention.

Referring now to FIG. 1, there is shown a side cross-sectional view of an apparatus according to a preferred embodiment of the present invention. The subsurface structure under the earth's surface 10 includes an upper, unsaturated or vadose zone, indicated generally at A, and a lower, saturated zone, indicated generally at B. Zones A and B meet at water table 12. Plume 14, containing chlorinated hydrocarbon contaminants, lies below surface 10. Plume 14 may be located partly in zone A and partly in zone B, as indicated in FIG. 1, or entirely within one of zones A or B.

Remediation apparatus 20 includes injection well system 22 having an approximately vertical shaft 24 leading to horizontal injection well 26. Pump 28 is operatively connected to shaft 24. Extraction well system 30 has an approximately vertical shaft 32, horizontal extraction well 34, and pump 36. Injection well 26 is situated below plume 14 in saturated zone B; extraction well 34 is above plume 14 in vadose zone A.

Testing module 40, to be described more fully below, is operatively connected to shaft 32 and pump 36, in any convenient location. If desired, an additional pump (not shown) may be connected between module 40 and extraction well 34.

Horizontal wells 26 and 34 have spaced multiple apertures 42, such as slots or perforations. Apertures 42 are large and numerous enough to allow fluid to flow freely therethrough, but narrow enough to keep soil particles from blocking the flow. Alternatively, wells 26 and 34 may be surrounded by mesh sleeves (not shown) to prevent blocking of apertures 42 by soil particles but allow the free flow of fluid out of well 26 and into well 34.

Figure 2:
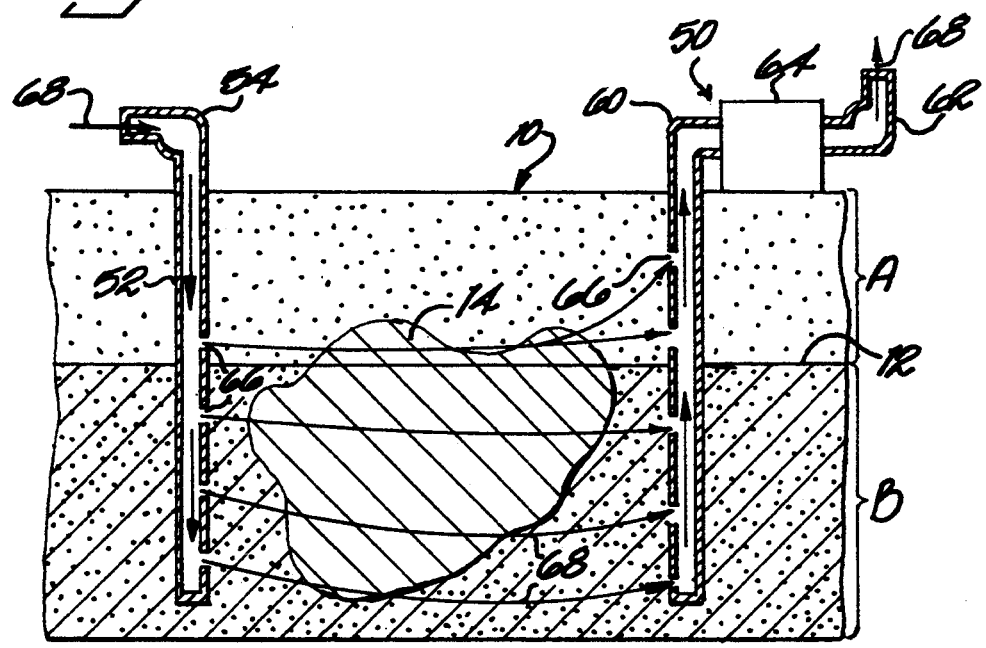
FIG. 2 is a side cross-sectional view of a physical embodiment of a bioremediation method according to another embodiment of the present invention.

Another embodiment of the present invention is shown in FIG. 2. Remediation apparatus 50 includes injection well 52 having pump 54 operatively connected thereto. Extraction well 60, with pump 62, is situated so that plume 14 is located between wells 52 and 60. Testing module 64 is operatively connected to extraction well 60 and pump 62, in any convenient location. Wells 52 and 60 have spaced multiple apertures 66 formed therein, similar in form and function to apertures 42 of horizontal wells 26 and 34 as described above.

Where pretreatment testing indicates the presence of sufficiently nonuniform subsurface conditions, the injection wells may be supplied with gated inserts for monitoring and controlling the flow rate of fluid therethrough, such as the insert described in commonly assigned patent application Ser. No. 07/730,424 (Corey, Flow Monitoring and Control System for Injection Wells, filed Jul. 16, 1991), now U.S. Pat. No. 5,186,255. The insert has a plurality of openings, some or all of which are equipped with fluid flow sensors and gates connected to a surface controller. The gate openings may be adjusted to approximately equalize the amount of fluid reaching different parts of plume 14.

Site characteristics such as the size and shape of contaminant plume 14, the contaminants present in plume 14, the subsurface geology of the area, fluid flow rates in the area and drilling economics dictate the dimensions, configuration and orientation of a remediation apparatus according to the present invention. For example, where plume 14 is situated partly or wholly in saturated zone B, horizontal wells may be preferable to help prevent spreading of plume 14 during treatment. The injection and extraction wells need not be substantially vertical or horizontal, the shafts need not have a particular shape, nor must the injection and extraction wells have the same general configuration. Depending on the characteristics of the site, the remediation apparatus may have a single injection well and a single extraction well, as indicated in FIGS. 1 and 2, or multiple wells arranged so that plume 14 lies therebetween. An injection well may consist of a single vertical shaft with a plurality of horizontal shafts branching outwards therefrom, or a plurality of circular shafts enclosing the contaminated region. The optimum configuration of the apparatus is determined after identifying and mapping plume 14.

Treatment is initiated after placement of the remediation apparatus. The treatment process for a TCE-containing plume 14 will be described with reference to a remediation apparatus 20 as illustrated in FIG. 1. However, it will be understood that similar procedures are employed with any remediation apparatus according to the present invention.

The site is initialized by activating pump 36 to extract air from extraction well system 30 and establish a flow gradient across plume 14. The optimum extraction rate depends on the subsurface soil conditions, including soil type and density, and is best established by a modest degree of experimentation and observation for each particular site. For example, for sandy soils, the extraction rate of pump 36 is preferably less than approximately 300 ft³/min (8.5 m³/min) and most preferably approximately 240 ft³/min (6.8 m³/min). The gradient established by operating pump 36 draws off-gas, indicated generally by arrows 44 (arrows 68 of FIG. 2), from injection well 26 across plume 14, into extraction well 34 and shaft 32.

At suitable intervals, off-gas samples are withdrawn at testing module 40 and assayed for methane, total volatile organic contaminants (VOC), TCE, polychloroethylene (PCE), tetrachloroethylene and potential breakdown products of TCE, tetrachloroethylene and PCE (including cis-DCE, trans-DCE, vinyl chloride, and carbon dioxide). Alternatively, module 40 may include means for conducting the analyses. Contaminants may be removed before venting the off-gas to the atmosphere, such as by filtering through an activated carbon filter. Pump 36 is operated until sampling confirms that steady state VOC concentrations have been reached in the off-gas.

The pretreatment baseline microbial characteristics of the subsurface environment are also determined. Site characterization data may be obtained from test site core samples, and may include such analyses as acridine orange direct counts, phospholipid fatty acid measurements, DNA probes, fluorescent antibody probes, plasmid frequency, methanotroph counts, total phosphorus and organic carbon, total Kjeldahl nitrogen, nitrate, and so forth.

After steady state VOC concentrations are reached, pump 28 injects air into shaft 24 of injection well system 22 while pump 36 continues to draw off-gas from extraction well system 30. As indicated by arrows 44, air flows from injection well 26 across plume 14, into extraction well 34. The optimum flow rate varies depending on the soil type and density. The extraction rate of pump 36 is preferably the same or higher than the injection rate of pump 28, and most preferably not more than approximately 20% higher. For sandy soils where the extraction rate of pump 36 is 240 ft³/min (about 6.8 m³/min), the injection rate of pump 28 is 200 ft³/min (about 5.7 m³/min). Some contaminants can be volatilized and removed from plume 14 by air stripping more easily or faster than by in situ degradation. Air injection with concomitant off-gas sampling continues until steady state VOC concentrations are again reached in the off-gas.

The initialization period may take several weeks. The actual time required to reach steady state VOC concentrations depends on factors including the size of plume 14, the concentration of contaminants in plume 14, the local subsurface soil conditions, the flow rates of pumps 28 and 36, and so forth.

Bioremediation treatment according to the present invention begins after measured off-gas VOC concentrations have reached a steady state. A mixture containing a nutrient fluid and an oxygenated fluid is injected via injection well system 22. The optimum injection rate depends on the characteristics of the site as discussed above. For sandy soils, the injection rate of pump 28 is preferably about 200 ft³/min (5.7 m³/min).

The nutrient fluid is selected to stimulate the growth and reproduction of subsurface microorganisms that are capable of aerobically degrading the contaminants in plume 14. The oxygenated fluid contains sufficient oxygen to create an environment for these microorganisms to degrade the contaminants aerobically. For a TCE-containing plume 14, a suitable nutrient fluid is methane; a suitable oxygenated fluid is air. The concentration of methane in the treatment mixture should be less than approximately 5 vol. % (the lower explosive limit of methane in air), preferably less than approximately 4 vol. % to provide a safety factor and prevent potentially hazardous build-up of methane at the site, and most preferably between approximately 3 vol. % and 1 vol. %. In this concentration range, the methane will not reach explosive concentrations and aerobic conditions will be maintained within the subsurface sediments.

The actual concentration of methane depends on the injection procedure of the treatment mixture. For example, continuous injection yields satisfactory results when the methane concentration is approximately 4 vol. %, but yields significantly better results when the concentration is approximately 1 vol. %. For pulsed injection, a methane concentration of approximately 4 vol. % usually yields the best results of all injection procedures.

As noted above, methanotrophs—indigenous methane-oxidizing bacteria—are capable of biodegrading TCE via a series of enzymes unique to this group of bacteria. Methane mono-oxygenase, the primary enzyme in the oxidation chain, is an extremely powerful oxidizer with the capability of oxidizing over 250 pollutants, including many chlorinated hydrocarbons such as TCE. The end products of methanotroph-induced degradation are carbon dioxide ($CO_2$) and chloride salts.

The mixture of nutrient fluid and oxygenated fluid is drawn across plume 14 by the flow gradient established by extraction pump 36. The methane in the mixture stimulates growth and reproduction of methanotrophs. Soil and groundwater samples may be collected and tested at intervals during treatment for measuring concentrations of pollutants, concentrations of methanotrophs, temperature, pH, dissolved oxygen, conductivity, and oxidation-reduction potential. VOC analyses may be performed on groundwater and off-gas samples, including measurements of TCE, tetrachloroethylene, PCE, methane, and potential daughter products of TCE (c-DCE, t-DCE, vinyl chloride, methylene chloride, $CO_2$, and so forth). Bacterial counts, particularly subsurface methanotroph concentration, may be obtained by any convenient method, preferably direct count using an acridine orange stain or aerobic heterotrophic plate counts.

Injection of the mixture is continued until methane appears in the off-gas samples collected at testing module 42, indicating that plume 14 is saturated with methane. Then, injection of the methane/air mixture is discontinued and the oxygenated fluid alone is injected at the same rate. The oxygen-containing oxygenated fluid—air—diffuses into plume 14, where it creates an environment for the methanotrophs to degrade the contaminants in plume 14.

The subsurface methanotrophs prefer to feed on methane from which they derive the energy needed for reproducing. The increased availability of methane due to injection of the nutrient fluid stimulates greatly increased growth and reproduction of the methanotrophs. After injection of the nutrient fluid ceases and the subsurface methane concentration decreases sufficiently due to consumption by methanotrophs, the methanotrophs degrade or "eat" the contaminants in plume 14. The methanotrophs derive little or no energy from the contaminants, so that eventually, after several days to more than a week, the concentration of methanotrophs begins to decrease and the microbial colony shows signs of stress. At that point the injection of nutrient fluid is resumed and the cycle repeats.

A representative subsurface methanotroph concentration (most probable number per ml) and TCE concentration (parts per billion) at a typical site is illustrated in FIG. 3. Before treatment, the methanotroph concentration would be very low, less than $10^{-2}$/ml, and subsurface TCE concentration could be over 600 ppb. After air injection is started, the TCE concentration would be expected to decrease to approximately 300 ppb due to air stripping. The methanotroph concentration increases upon injection of a mixture containing 1 vol. % methane in air, reaching a peak of over $10^4$/ml after approximately 50 days of treatment. The TCE concentration would then decrease thereafter due to methanotroph-induced degradation. If the TCE concentration stabilizes at a lower level or the methanotroph concentration shows a significant decline, a second methane/air pulse would be supplied to stimulate the methanotroph population for further degradation of TCE.

Treatment of TCE thus consists of periodic injections of a nutrient fluid (methane) together with continuous injection of a oxygenated fluid (air). The duration of each treatment cycle, consisting of injection of a methane/air for a time followed by air, depends on the subsurface soil conditions and the concentration of contaminants in plume 14. The duration of each portion of the cycle is empirically determined during treatment. A cycle may take as little as a few days or longer than a week. The methanotroph population can increase by a factor of $10^6$ or more during a typical cycle. By saturating the subsurface soil with methane to stimulate increased reproduction of methanotrophs, then halting the methane injection but continuing the oxygen injection and waiting until the decreasing TCE concentration stabilizes and/or the concentration of methanotrophs begins to decline before adding more methane, the methanotrophs alternately "feast" and "starve." During the "feast" period of the cycle, availability of methane stimulates reproduction, leading to an increased methanotroph population. During the "starve" period, the methanotrophs lack their preferred nutrient and are forced to consume TCE or other contaminants present in plume 14. If the methane injection is not halted, the methanotrophs prefer the methane to the TCE. If no methane is injected, the methanotroph colony never grows to the size where it can degrade TCE with the requisite speed.

This cycle is repeated, with periodic methane pulses superimposed on continuous air injection, until the measured contaminant concentration in plume 14 is reduced to an acceptable level. The treatment can result in degradation of pollutants down to the lower limit of currently detectable levels, on the order of 2 ppb.

Movement of the treatment and oxygenated fluids across plume 14 is facilitated if the extraction rate of pump 36 is the same or higher than the injection rate of pump 28, so that a flow gradient is maintained across plume 14. This also helps prevent spreading of plume 14 during treatment. However, to decrease the contribution of abiotic processes such as air stripping to the removal of contaminants from plume 14, the extraction rate is preferably no more than approximately 20% higher than the injection rate. Depending on the nature and amounts of contaminants in plume 14, hazardous contaminants removed by air stripping may need to be filtered from the extracted off-gas for subsequent disposal, increasing the expense of the remediation process. Nonhazardous end products of contaminants degraded in situ may simply be left in place.

The oxygenated fluid—air in the example described above—contains oxygen so that the environment of plume 14 is aerobic rather than anaerobic, to avoid excessive anaerobic formation of toxic byproducts of TCE such as vinyl chloride. However, anaerobic zones or "pockets" are left, at least temporarily, in the otherwise generally aerobic environment of plume 14 during injection of the oxygenated fluid; that is, anaerobic zones are surrounded by a generally aerobic environment, thus defining "pockets." While not wishing to be bound by theory, it is believed that the combination of the anaerobic zones or pockets within the overall aerobic environment breaks down the pollutants such as tetrachloroethylene. To the extent any vinyl chloride is formed anaerobically, it is degraded extremely quickly and efficiently within this environment.

Air is preferably the oxygenated fluid used because of its low cost. However, other oxygenated fluids, including but not limited to pure oxygen, oxygen-nitrogen mixtures, water vapor or steam may also be used. In addition to their low cost, air and other inexpensive gases have greater permeability than liquid, and therefore are more preferred than water or steam. Unlike prior degradation methods discussed above, peroxide is generally not used in the preferred embodiment.

The nutrient fluid may include active gases such as propane instead of methane. Alternatively, propane may be added to the methane/air treatment mixture in an amount of 5-30 vol. % of the amount of methane present in the mixture. Thus, an air/methane mixture containing 3 vol. % methane may also contain approximately 0.15-0.9 vol. % propane.

Depending on the types of contaminants present in plume 14, it may be desirable to stimulate subsurface microorganisms other than methanotrophs. It will be evident that the feast/starve method and apparatus for using this method may be used for other microorganisms without departing from the spirit of the present invention.

Also, if desired, other nutrients may be injected into plume 14 to facilitate treatment, including but not limited to small amounts of ammonia, phosphates, sulfates, and various trace nutrient elements. For example, a low concentration of ammonia (less than 0.1 vol. % ammonia) could be pulsed counter to the nutrient fluid. Counter pulsing ensures that the subsurface microbes do not experience an abundance of nitrogen and methane simultaneously.

Methanotrophic degradation is most efficient when the soil pH is in the range 5.0-7.5. Therefore, maintaining the pH of plume 14 approximately within this range helps optimize the efficiency of the remediation process. This may be accomplished by the addition of low concentrations of ammonia, nitrous oxide, or other suitable substances to plume 14.

If appropriate, plume 14 may be periodically rehydrated to inhibit the potential drying effect of air flow across plume 14. Hydration may be accomplished by pumping water vapor or steam into injection well 22, and drawing the fluid across plume 14 by operating extraction pump 36. If the oxygenated fluid is water vapor or steam as discussed above, a separate hydrating step may be unnecessary if sufficient water is thereby supplied to plume 14.

The methane-induced enzymes in the subsurface methanotrophs are known to co-metabolically oxidize over two hundred and fifty organic compounds in addition to TCE, including PCE, benzene, toluene, and xylene. These pollutants are widespread, and must be reduced to very low levels (less than 5 ppb) for groundwater to be considered non-polluted. Since many sites have a combination of these or similar compounds, a remediation apparatus according to the present invention addresses the degradation of a wide spectrum of other pollutants as well as that of TCE.

A remediation apparatus as described above provides significant advantages over conventional bioremediation nutrient delivery techniques. The use of injection and extraction wells configured to the site allows efficient delivery and recovery of the nutrient fluid, inhibits spreading of the contaminants, and minimizes formation clogging and plugging phenomena. Horizontal wells, in particular, provide a very efficient delivery of fluid throughout the contaminated region.

Use of a remediation apparatus according to the present invention results in significant reductions in the time required to complete treatment. Some contaminants may be removed via air stripping as air is drawn across plume 14 and extracted by pump 36. Methanotroph-induced degradation of the contaminants provides an additional, more effective pathway for removal of the contaminants. Furthermore, the methanotrophs can enter subsurface formations that may be difficult to access by air stripping alone.

In situ bioremediation technologies are often less expensive than alternative technologies that involve removal and destruction of the contaminants. For example, the cost of the remediation apparatus described above is estimated to be 40%-60% less than the cost of air stripping combined with carbon adsorption of the air stream. However, it will be understood that actual costs depend on the characteristics of the site to be treated, including the nature and concentration of the contaminants present at the site, the size of the contaminated area, the subsurface geology, and so forth.

It will be apparent to those skilled in the art that many changes and substitutions can be made to the preferred embodiment herein described without departing from the spirit and scope of the present invention as defined by the appended claims.

What is claimed is:

1. A method for enhancing the degradation of contaminants in soil, said contaminants present at a contaminant concentration, said soil containing microbes capable of degrading said contaminants aerobically, said microbes present at a first concentration, said method comprising the steps of:

continuously injecting an oxygenated fluid into said soil to establish a generally aerobic environment in said soil, leaving pockets of anaerobic environments in said soil;

injecting for a first interval of time a nutrient fluid into said soil to feed said microbes and increase said first concentration to a second concentration higher than said first concentration; then withholding said nutrient fluid so that said microbes are forced to degrade said contaminants; then, when said second concentration has decreased to a third concentration, resuming injection of said nutrient fluid to increase said third concentration; and continuing to inject and then withhold said nutrient until said contaminant concentration is below a preselected level.

2. The method as recited in claim 1, wherein said contaminants are chlorinated hydrocarbons, said microbes are methanotrophs, and said nutrient fluid contains methane.

3. The method as recited in claim 1, wherein said oxygenated fluid is selected from the group consisting essentially of air, pure oxygen, an oxygen and nitrogen mixture, water vapor and steam.

4. The method as recited in claim 1, wherein said nutrient fluid contains no more than approximately 4 volume percent of methane.

5. The method as recited in claim 1, wherein said oxygenated fluid is air.

6. The method as recited in claim 1, wherein said oxygenated fluid is air and said nutrient fluid contains not more than approximately 4 volume percent of methane.

7. The method as recited in claim 1, wherein said nutrient fluid contains approximately 1 volume percent of methane and wherein said nutrient fluid injecting step further comprises continuously injecting said nutrient fluid into said soil.

8. The method as recited in claim 1, wherein said preselected level is approximately 5 parts per billion.

9. The method as recited in claim 1, wherein said nutrient fluid is injected into said soil until said soil is saturated with said nutrient fluid.

10. The method as recited in claim 1, wherein said first interval of time is at least one day.

11. The method as recited in claim 1, wherein said microbes can be characterized by a microbial concentration, and wherein said first interval of time is long enough for said microbial concentration to increase by approximately a million-fold.

12. The method as recited in claim 1, further comprising the step of establishing a flow of said nutrient fluid and said oxygenated fluid across said contaminants in said soil.

13. A method for enhancing the degradation of contaminants in a plume in soil, said soil containing microbes capable of degrading said contaminants aerobically at a first rate, said contaminants being characterizable by a concentration, said microbes being characterizable by a concentration, said method comprising the steps of:

continuously injecting an oxygenated fluid into said soil to establish a generally aerobic environment in said soil, leaving a plurality of anaerobic pockets in said soil;

injecting a nutrient fluid into said soil for a first interval of time to feed said microbes so that said microbes grow upon said nutrient fluid and reproduce, thereby increasing said concentration of said microbes; then withholding said nutrient fluid so that, after said microbes consume at least a portion of said nutrient fluid, said microbes degrade said contaminants; while extracting said nutrient fluid and said oxygenated fluid from said soil so as to establish a flow of said nutrient fluid through said plume;

monitoring said concentration of microbes;

monitoring said concentration of contaminants; and repeating said injecting steps until said concentration of said contaminants is decreased to a preselected level.

14. The method as recited in claim 13, wherein said nutrient fluid contains methane and said microbes are methanotrophs.

15. The method as recited in claim 13, wherein said nutrient fluid contains approximately 4 volume percent of methane and said oxygenated fluid is air.

16. The method as recited in claim 13, wherein said oxygenated fluid is selected from the group consisting essentially of air, pure oxygen, an oxygen and nitrogen mixture, water vapor, and steam.

17. The method as recited in claim 13, wherein said nutrient fluid contains approximately 1 volume percent of methane and wherein said nutrient fluid injecting step further comprises continuously injecting said nutrient fluid into said soil.

18. The method as recited in claim 13, wherein said first interval of time ends when said plume is saturated with said nutrient fluid.

19. The method as recited in claim 13, wherein said interval of time is at least a one day.

* * * * *